United States Patent [19]

Bormioli

[11] 4,190,086
[45] Feb. 26, 1980

[54] CONNECTOR DEVICE FOR THE QUICK COUPLING OF FLOATING HOSES

[76] Inventor: Giorgio Bormioli, Via Galileo Galilei 21, Padova, Italy

[21] Appl. No.: 939,345

[22] Filed: Sep. 5, 1978

[51] Int. Cl.² ............................................. F16L 55/00
[52] U.S. Cl. .................................... 138/89; 138/96 R; 138/103; 138/109; 138/178; 9/8 R; 285/47
[58] Field of Search .................. 405/162, 171; 138/89, 138/96 R, 96 T, 103, 109, 178; 9/8 R; 220/216, 218, 221, 222; 215/348; 285/45, 47, 320

[56] References Cited
U.S. PATENT DOCUMENTS

| 3,167,793 | 2/1965 | Keats | 9/8 R |
| 3,207,184 | 9/1965 | Lampert | 138/89 |
| 3,674,225 | 7/1972 | Johnson | 9/8 R X |

Primary Examiner—Richard E. Aegerter
Assistant Examiner—James E. Bryant, III
Attorney, Agent, or Firm—Shlesinger, Fitzsimmons & Shlesinger

[57] ABSTRACT

A quick coupling connector device, which is intended for use as a terminal connecting member for a floating hose piping. The connector device is composed of two floating parts, which define, when assembled, one single floating body with hydraulic seal properties.

One of said parts can be attached to the floating pipe and comprises remotely controlled quick coupling means, while the other part is a detachable sealing cover for said one part.

2 Claims, 1 Drawing Figure

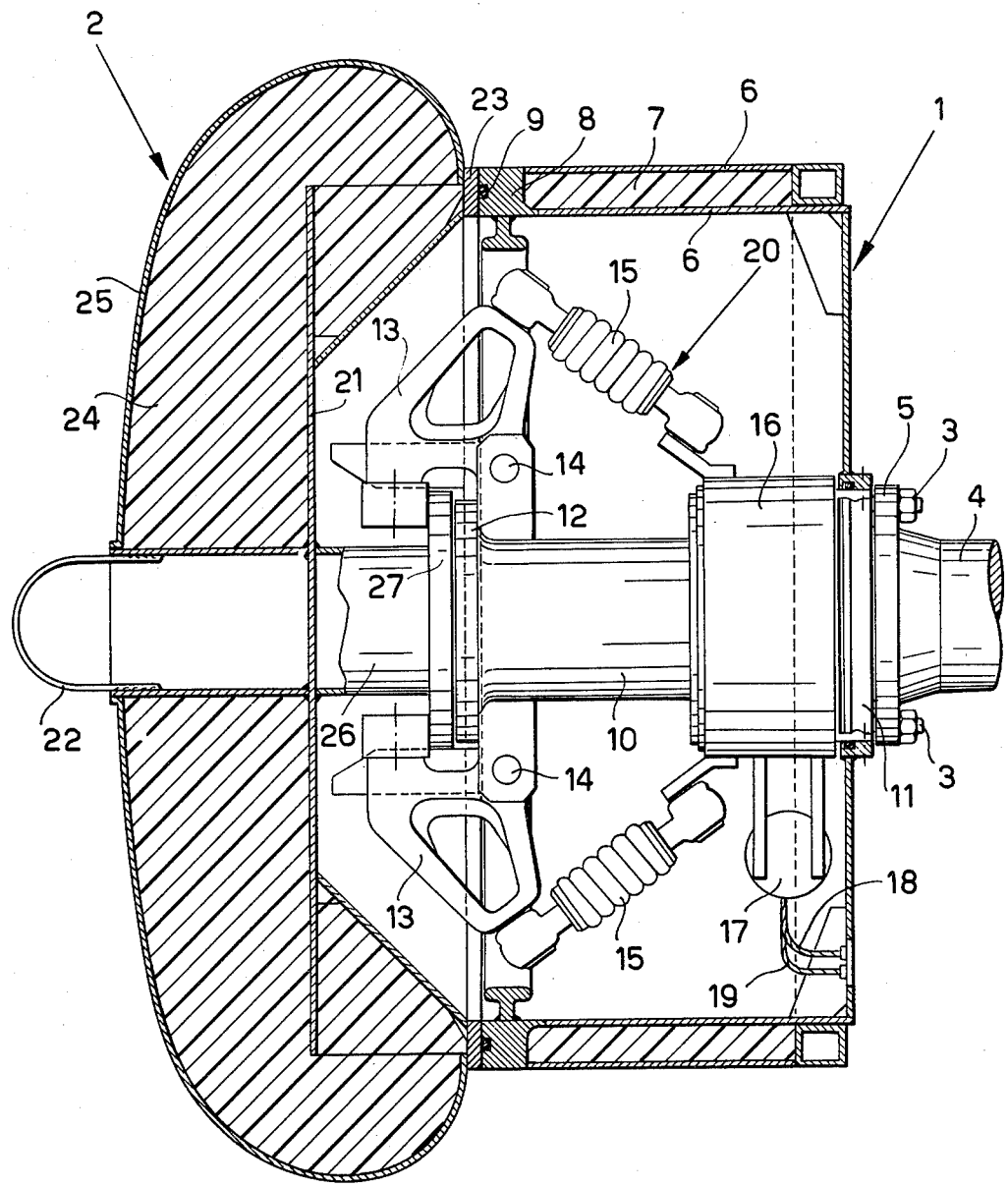

CONNECTOR DEVICE FOR THE QUICK COUPLING OF FLOATING HOSES

The present invention relates to a connector device for the quick coupling which is intended to act as a terminal connecting member for a floating hose piping for the transshipment of fluid petroleum products from ship to shore and viceversa.

It is known that for the transferring of fluid petroleum products within seaports or, for instance, in the nearness of drilling platforms, it is usual to resort to the use of special devices for quick coupling connection (for instance of the kind described in my U.S. Pat. No. 3,558,161), which carry out the connection of a stiff piping placed on a ship with a flexible pipe or "hose" freely floating on the water.

The connector device normally constitutes a separate group which a watercraft carries towards the ship when needed, where it is hoisted by means of suitable lifting equipment and where finally it is made to work to carry out the desired connection between the fixed piping and the floating hose (which in turn is hoisted onto the ship).

That determines rather lengthy operations of transport and hoisting on the ship and of bolting to one of the pipings to be connected (usually the flange of the collector of the ship and of course inverse operations equally lengthy.

It is an object of the present invention to provide a connecting device for quick coupling that simplifies and quickens the operations of coupling a floating hose with a piping placed on a ship or on another floating craft.

According to the invention that object is attained by means of a connector device for quick coupling that is characterized in that it is composed of two parts both apt to float and defining as a whole one single floating body with hydraulic seal, one first portion comprising a section of flanged piping apt to be constrained to said floating piping and means apt to be controlled from outside for the quick coupling of said section of piping with a further piping to be connected to said floating piping, and the second portion being intended to act a sealing cover for said first portion and comprising to that end a piece of piping closed at one end and provided with a flange at its other end for the quick coupling with said section of piping of the first portion by means of said means apt to be controlled from outside.

By virtue of the structure described the connector device according to the invention is intended to remain permanently connected with the floating hose in the capacity of a terminal jointing member which too is floating.

If it is desired to carry out the connection of said floating piping with a piping located on the ship, the whole connecting equipment with the hose attached to its first portion, is hoisted onto the ship, whereafter its second portion or cover is removed after unhooking by means of control from outside of the quick coupling means and in its place the connection, again a quick coupling connection, is carried out of the piping situated on the ship. The inverse operations are carried out of course in the step of disjunction. If, during the trans-shipping of the mineral oil products and, therefore, with pipings connected through the first portion of the connector device while the second portion or cover is separated from the remainder of the connector, there should arise a situation of danger, the emergency could be rapidly faced by effecting the quick disjunction of the pipings and throwing into the sea the hose with the first portion of the connector attached thereto and floating and the second portion of the connector which in turn is floating.

Definitely, therefore, the connector device according to the invention enables thus to carry out simple and rapid operations of connection and disconnection, as well as the brilliant overcoming of conditions of danger. Moreover the connector device always remains attached to the floating hose, without making every time necessary its transport on a watercraft.

The features of the present invention will appear more clearly from the following detained description of its possible embodiments in practice, shown by way of example, partly in axial section, in the single FIGURE of the accompanying drawing.

The connector device shown in the drawing is formed by two portions 1 and 2, both able to float on the water, which form together a whole floating body with hydraulic seal, that is apt to be connected by means of bolts 3 to a floating piping or hose 4 provided with an external flange 5.

The portion 1 comprises a double external shell or jacket 6 packed with polyvinyl chloride or other material 7 adapted to impart to the entire portion the desired floating properties. Said shell or jacket is provided with a front flange 8 equipped with a hydraulic sealing ring 9.

Inside the double external shell or jacket 6 there is provided coaxially thereof a section of piping 10 which is provided with end flanges 11 and 12, the former of which can be constrained to the flange 5 of the hose 4 by means of the bolts 3. Mounted on the other flange 12 is a plurality of jaws 13, which are rotatable on pivots 14, and which are connected to elastic rods 15 which are equipped with end articulations. A thrust bearing or block 16 is rotatable on the body of the section of piping 10, and by a hydraulic control cylinder 17 is controllable from outside through conduits 18 and 19. These items 12 through 19 form a quick coupling device 20 of the kind similar to that described in my U.S. Pat. No. 3,558,161 (and, therefore, not illustrated in further detail).

The portion 2, acting as a cover, has in turn an external shell in the shape of a mushroom which is formed by a metal sheet part 21 equipped with a handle 22 and a flanging 23 to be leaned against the opposite flanging 8 of the portion 1 and by a big external body of polyvinyl chloride or other floating material 24 coated with a hardening paint 25. To the metal sheet part 21 there is fastened a piece of piping 26, which has been closed at one end and is equipped at its other end with a flange 27 that can be leaned and locked against the opposite flange 12 of the section of piping 10 (at the same time as the abutting of the external flangings 8 and 23) by means of the quick coupling device 20.

The whole connector device as shown in the drawing normally is floating in the sea at one end of the hose 4. If the hose is to be connected with a piping located on a ship, the connector device and hose are hoisted, the opening of the jaws 13 is obtained by control from outside, the cover 2 is pulled off and finally the quick coupling is done (always by way of the jaws 13), of the section of piping 10 with the flanged end of the piping placed on the ship.

The inverse operations are carried out in the step of normal disjunction of the pipings.

In case of danger, instead, only the quick disconnection of the piping placed on the ship is effected and the two portions of connection 1 and 2 are thrown into the sea as they are, namely separated from each other.

I claim:

1. A connector device for quickly coupling one end of a buoyant, flexible hose to one end of a pipe, comprising a pair of buoyant housings having cooperating ends releasably attachable together to form a single floating body with a hydraulic seal between said cooperating ends, one of said housings containing a first section of piping having one end secured to said one end of said hose, the other of said housings having thereon a further section of piping closed at one end and releasably and sealingly attachable at its opposite end to the opposite end of said first section of piping to function as a cover therefor, and means in said one housing and operable from the exterior thereof for releasably securing said opposite end of said first section of piping selectively to said opposite end of said further section of piping, or to said pipe when said housings are detached from each other.

2. A connector device according to claim 1, wherein said two housings have respective external shells provided with flangings abuttable against one another at the same time at which there is carried out the quick coupling between said sections of piping there being provided means of effecting a hydraulic seal between said flangings, when abutted, to prevent entry of water into the interior of the two coupled shells.

* * * * *